United States Patent
Mori et al.

(10) Patent No.: US 6,427,205 B1
(45) Date of Patent: Jul. 30, 2002

(54) DIGITAL SIGNAL PROCESSOR AND PROCESSOR REDUCING THE NUMBER OF INSTRUCTIONS UPON PROCESSING CONDITION EXECUTION INSTRUCTIONS

(75) Inventors: Koichi Mori, Yokohama; Toshiyuki Furusawa, Koutou-Ku; Daisuke Sonoda, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/342,266

(22) Filed: Jun. 29, 1999

(30) Foreign Application Priority Data

Jun. 30, 1998 (JP) .......................................... 10-185158

(51) Int. Cl.$^7$ ................................................ G06F 9/38
(52) U.S. Cl. ...................... 712/226; 712/205; 712/234
(58) Field of Search .............................. 712/205, 234, 712/226, 218, 208

(56) References Cited

U.S. PATENT DOCUMENTS

| | | | |
|---|---|---|---|
| 3,651,476 A | * 3/1972 | Metz et al. | 712/220 |
| 5,748,935 A | * 5/1998 | Tremblay et al. | 712/216 |
| 6,009,512 A | * 12/1999 | Christie | 712/226 |
| 6,192,515 B1 | * 2/2001 | Doshi et al. | 717/9 |

FOREIGN PATENT DOCUMENTS

JP 6-301538 10/1994

OTHER PUBLICATIONS

Albert Y. Zomaya (Parallel and distributed computing handbook) 1996 McGraw–Hill pp. 639–640.*

* cited by examiner

Primary Examiner—Richard L. Ellis
Assistant Examiner—Gautam R. Patel
(74) Attorney, Agent, or Firm—Oblon, Spivak, McClelland, Maier & Neustadt, P.C.

(57) ABSTRACT

In a digital signal processor for pipeline processing divided into at least three steps, i.e., instruction fetch cycle, instruction decode cycle and instruction execution cycle, a value of a register (A) is put on a data bus assuming the condition is consistent when a condition execution instruction is decoded in an instruction decoder (14). Then, in the instruction execution cycle of the condition execution instruction, a register (B) introduced the value on the data bus when upon consistency of the condition. As a result, even before a condition flag (Z) changes as a result of execution of the instruction for generating the condition in the instruction execution cycle, the condition execution instruction can be decoded. Thus, the processor may omit an instruction other than "condition generation instruction or condition execution instruction" which was conventionally required.

6 Claims, 7 Drawing Sheets

INSTRUCTION N

INSTRUCTION N+1

INSTRUCTION N+2

→ TIME T

DIGITAL SIGNAL PROCESSOR AND PROCESSOR REDUCING THE NUMBER OF INSTRUCTIONS UPON PROCESSING CONDITION EXECUTION INSTRUCTIONS

BACKGROUND OF THE INVENTION

1. Field of the Invention

This invention relates to a digital signal processor and a processor, and more particularly to a digital signal processor and a processor improved toward a decrease of processing instructions during execution of conditional instructions.

2. Description of the Prior Art

Processing by a digital signal processor (hereinafter called DSP) is pipeline-controlled, and it is divided into three steps, namely, fetching of an instruction, decoding of the instruction and execution of the instruction for instance. An example of pipeline processing made up of these three steps is shown in FIG. 4.

As shown in FIG. 4, in pipeline processing of DSP, fetching, decoding and execution of an instruction progress in parallel. That is, when fetching of an instruction N is completed, the instruction N is decoded, and a next instruction N+1 is fetched concurrently. Then, the instruction N is executed, instruction N+1 is decoded, and a still next instruction N+2 is fetched. In this manner, by dividing processing of every single instruction into three steps, processing of instructions is repeated sequentially.

For executing such pipeline processing, it was the problem that one cycle had to be skipped before a condition execution instruction. That is, an instruction other than "condition generation instruction or condition execution instruction" had to be inserted before the condition execution instruction. In other words, an instruction not changing the condition flag and other than the condition execution instruction had to be inserted. Grounds of this problem is explained below in detail with reference to FIGS. 5 through 7.

FIG. 5 is a diagram showing a hardware construction of DSP for transferring contents of a register A to a register B under a condition by using such a pipeline processing function. FIG. 6 is a timing chart in case of the condition being consistent. FIG. 7 is a timing chart in case of the condition being inconsistent.

As shown in FIG. 5, a program counter is supplied to instruction memory 100. Based on a value of the program counter, an instruction is read and introduced into an instruction register 102 in an instruction fetch cycle. The instruction taken into the instruction register 102 is decoded by an instruction decoder 104 in an instruction decode cycle. The instruction decoder 104 is supplied with a condition flag Z from a condition judge block 106. The instruction decoder 104 decodes the condition flag Z as well upon decoding the instruction from the instruction register 102. Therefore, the content of the condition flag Z has to be fixed before decoding the instruction. In accordance with the content of the condition flag Z, that is, depending on whether the condition is consistent or not, a signal is output to a gate 108 of the register A. That is, when the condition is consistent, an enable signal is output to the gate 108. When the condition is not consistent, the enable signal is not output to the gate 108. Therefore, when the condition is inconsistent, the value of the register A does not ride on the data bus. When the condition is consistent, a B register clock is supplied to a register B from an OR circuit 110, and the content of the register A is taken into the register B. In contrast, when the condition is inconsistent, no B register clock signal is supplied to the B register from the OR circuit 110, and the content of the register A is not taken into the register B.

Next explained is an operation timing in case of consistency of the condition with reference to FIG. 6. Instruction N is an instruction for generating a condition, with which the flag Z becomes 1 or 0 in accordance with the result of an operation instruction, for example. Instruction N+1 is an instruction other than "condition generation instruction or condition execution instruction", which does not change the flag Z and which is other than condition execution instruction. Typically, "No Operation" instruction which instructs nothing be executed is inserted. Instruction N+2 is a condition execution instruction which instructs execution of the instruction only under a certain result of the instruction N. For example, it is such as "if Z=0 then B=A".

As will be understood from FIG. 6, instruction N for generating a condition is fetched in a clock cycle T1. In the next clock cycle T2, instruction N is decoded, and instruction N+1 other than "condition generation instruction or condition execution instruction" is fetched simultaneously. In the next clock cycle T3, instruction N is executed, and the condition flag Z rises upon the rising edge of the register clock. In the clock cycle T3, instruction N+1 is decoded simultaneously. However, since the condition flag Z does not rise during decoding, the proper content is not obtained yet even by decoding the condition execution instruction. Therefore, instruction N+1 other than "condition generation instruction or condition execution instruction" has to be inserted. In the clock cycle T3, instruction N+2 which is condition execution instruction is fetched concurrently.

In the clock cycle T4, instruction N+2 is decoded. In the clock cycle T4, since execution of the instruction N for generating a condition is already completed, the condition flag Z is up. Therefore, condition execution instruction N+2 meets with the condition flag Z, proper decoding is executed. That is, in the example of FIG. 6 on a case with the condition being consistent, decoding is executed to replace the register B with the register A. As a result, the value of the register A rides on the data bus at the rising edge of the register clock, and the B register clock enable changes from HIGH to LOW.

In the clock cycle T5, condition execution instruction N+2 is executed. That is, the B register clock is input to the register B, and the value on the data bus is taken into the B register at the rising edge of the B register clock. In the next clock cycle T6, et seq., the value of the register B maintains the value of the register A taken last.

Next explained is an operation timing of a case where the condition is inconsistent. As shown in FIG. 7, the sequence progresses in the same manner as the case with the condition being consistent up to the clock cycle T3. Therefore, also in the clock cycle T4, et seq., the condition flag Z keeps down. B register clock enable keeps HIGH. As a result, no B register clock is supplied to the B register.

In the clock cycle T4, condition execution instruction N+2 is decoded. During the decoding process, the condition flag Z is decoded together. In this case, since the condition is inconsistent, it is necessary to prevent replacement of the register B by the content of the register A. For this purpose, condition execution instruction is changed to "No Operation" instruction upon decoding. Therefore, the content of the register A does not ride on the data bus in the clock cycle T5. Additionally, since no B register clock is input to the B register, the content of the register B is not changed. Also in the clock cycle T6, the content of the register B is not changed.

As explained above, conventional techniques involved the constraint that one cycle had to be skipped before a condition execution instruction. That is, since it was necessary to complete execution of a condition generation instruction and fix the content of the condition flag Z upon decoding a condition execution instruction, there was the constraint that an instruction other than "condition generation instruction or condition execution instruction" had to be inserted between an instruction for generating a condition and a condition execution instruction. The requirement to insert a redundant instruction which is an instruction other than "condition generation instruction or condition execution instruction" was one of factors increasing useless processes. Especially when a program containing such instructions had to be repeatedly executed as a loop over thousands or ten thousands of times, this problem greatly affected the entire processing time and could not be disregarded.

SUMMARY OF THE INVENTION

It is therefore an object of the invention to provide a digital signal processor and a processor which need not skip one cycle just before a condition execution instruction, if any. That is, it is intended with the present invention to provide a digital signal processor and a processor not requiring insertion of an instruction other than "condition generation instruction or condition execution instruction" between an instruction for generating a condition and a condition execution instruction. In other words, the invention has its object in providing a digital signal processor and a processor capable of consecutively executing an instruction for generating a condition and a condition execution instruction using the condition. Additionally, the invention intends to provide a digital signal processor and a processor removing the need for inserting an instruction other than "condition generation instruction or condition execution instruction" in this manner and thereby improving the efficiency of the entire processing.

According to the invention, there is provided a digital signal processor for executing pipeline processing divided into at least three steps which are an instruction fetch cycle, an instruction decode cycle and an instruction execution cycle, comprising:

instruction memory storing a program;

an instruction register synchronous with a first clock signal to fetch an instruction of the program from the instruction memory in accordance with a program counter in the instruction fetch cycle;

an instruction decoder synchronous with the fist clock signal to decode the instruction fetched in the instruction register in the instruction decode cycle, the instruction decoder decoding the instruction under the assumption that a condition be consistent when the instruction is a condition execution instruction whose execution depends upon a result of execution of an instruction for generating the condition; and a conditional instruction execution circuit synchronous with the first clock signal to execute the instruction pursuant to a result of decoding and store a result of execution in the instruction execution cycle, the conditional instruction execution circuit being configured to execute the condition execution instruction and store the result of execution of the condition execution instruction in the instruction execution cycle for the condition execution instruction when the condition is consistent as a result of execution of the instruction for generating the condition, and to execute the condition execution instruction but not store the result of execution of the condition execution instruction when the condition is inconsistent.

According to the invention, there is further provided a digital signal processor for executing pipeline processing divided into at least three steps which are an instruction fetch cycle, an instruction decode cycle and an instruction execution cycle, comprising:

instruction memory storing a program;

an instruction register synchronous with a first clock signal to fetch an instruction of the program from the instruction memory in accordance with a program counter in the instruction fetch cycle;

an instruction decoder synchronous with the fist clock signal to decode the instruction fetched in the instruction register in the instruction decode cycle, the instruction decoder outputting a first enable signal to one register so as to put the value of the one register onto a data bus under the assumption that a condition be consistent in the case where the decoded instruction is a condition execution instruction for transferring the value of the one register to another register only when the result of execution of the instruction for generating a condition is consistent with a predetermined condition; and a gating circuit for controlling the supply of a second clock signal in the instruction execution cycle of the condition execution instruction to supply said second clock signal to the another register thereby to permit same to introduce the value on the data bus upon consistency of the condition, and not to supply the second clock signal to the another register thereby to prevent the value on the data bus from being introduced into the another register upon inconsistency of the condition.

According to the invention, there is further provided a processor for executing pipeline processing divided into at least three steps which are an instruction fetch cycle, an instruction decode cycle and an instruction execution cycle, comprising:

instruction memory storing a program;

an instruction register synchronous with a first clock signal to fetch an instruction of the program from the instruction memory in accordance with a program counter in the instruction fetch cycle;

an instruction decoder synchronous with the fist clock signal to decode the instruction fetched in the instruction register in the instruction decode cycle, the instruction decoder decoding the instruction under the assumption that a condition be consistent when the instruction is a condition execution instruction whose execution depends upon a result of execution of an instruction for generating the condition; and a conditional instruction execution circuit synchronous with the first clock signal to execute the instruction pursuant to a result of decoding and store a result of execution in the instruction execution cycle, the conditional instruction execution circuit being configured to execute the condition execution instruction and store the result of execution of the condition execution instruction in the instruction execution cycle for the condition execution instruction when the condition is consistent as a result of execution of the instruction for generating the condition, and to execute the condition execution instruction but not store the result of execution of the condition execution instruction when the condition is inconsistent.

DETAILED DESCRIPTION OF THE PREFERRED EMBODIMENTS

Whilst conventional techniques required consistency/inconsistency of the condition be determined before a decode cycle of a condition execution instruction, an embodiment shown here is so configured that, only if consistency/inconsistency of the condition is determined before an execution cycle of a condition execution instruction, the condition execution instruction takes place by using a result of the condition. The embodiment is explained below in detail with reference to the drawings.

Figure 1:
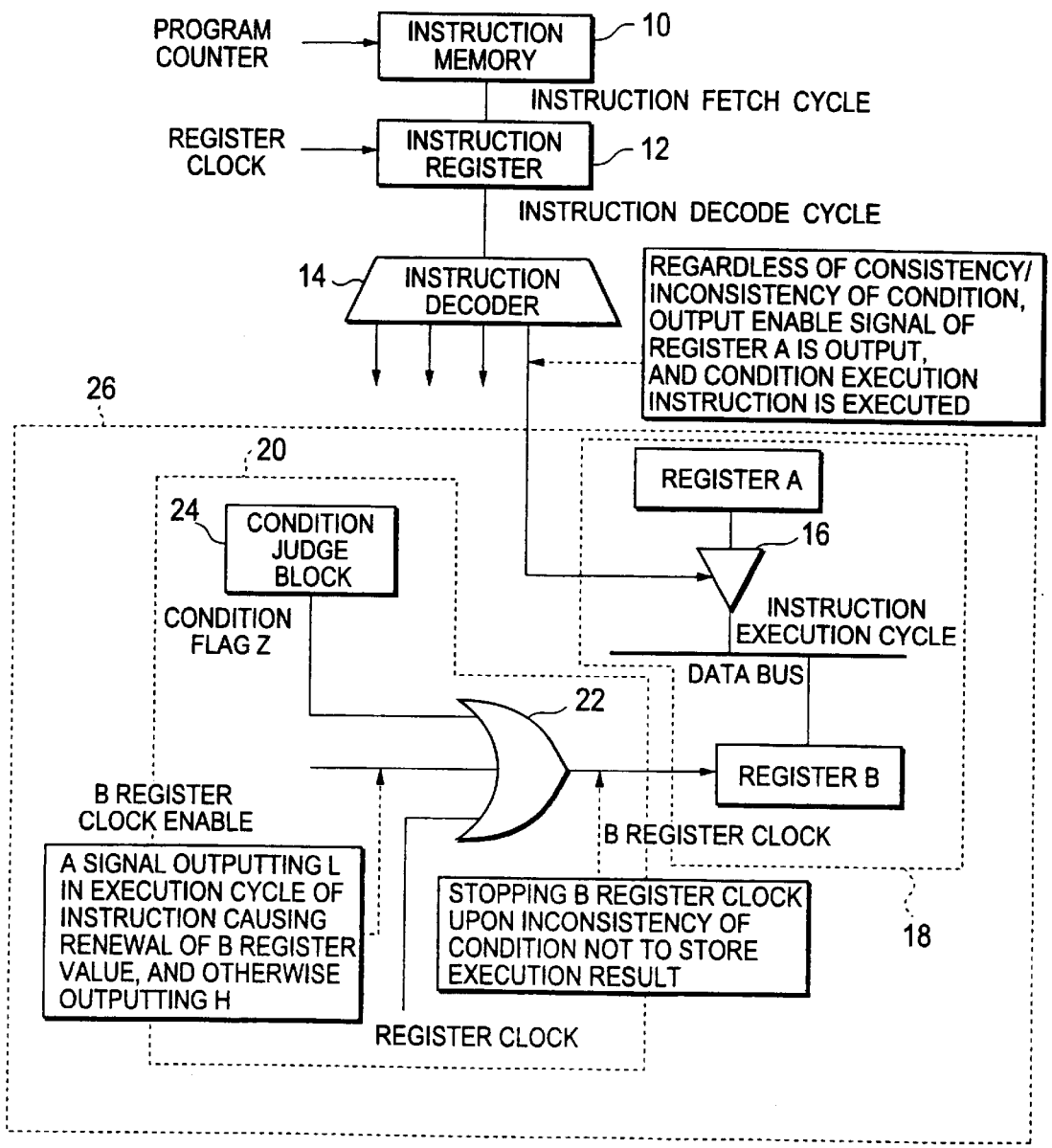
FIG. 1 is a diagram showing construction of a digital signal processor according to an embodiment of the invention.
Figure 2:
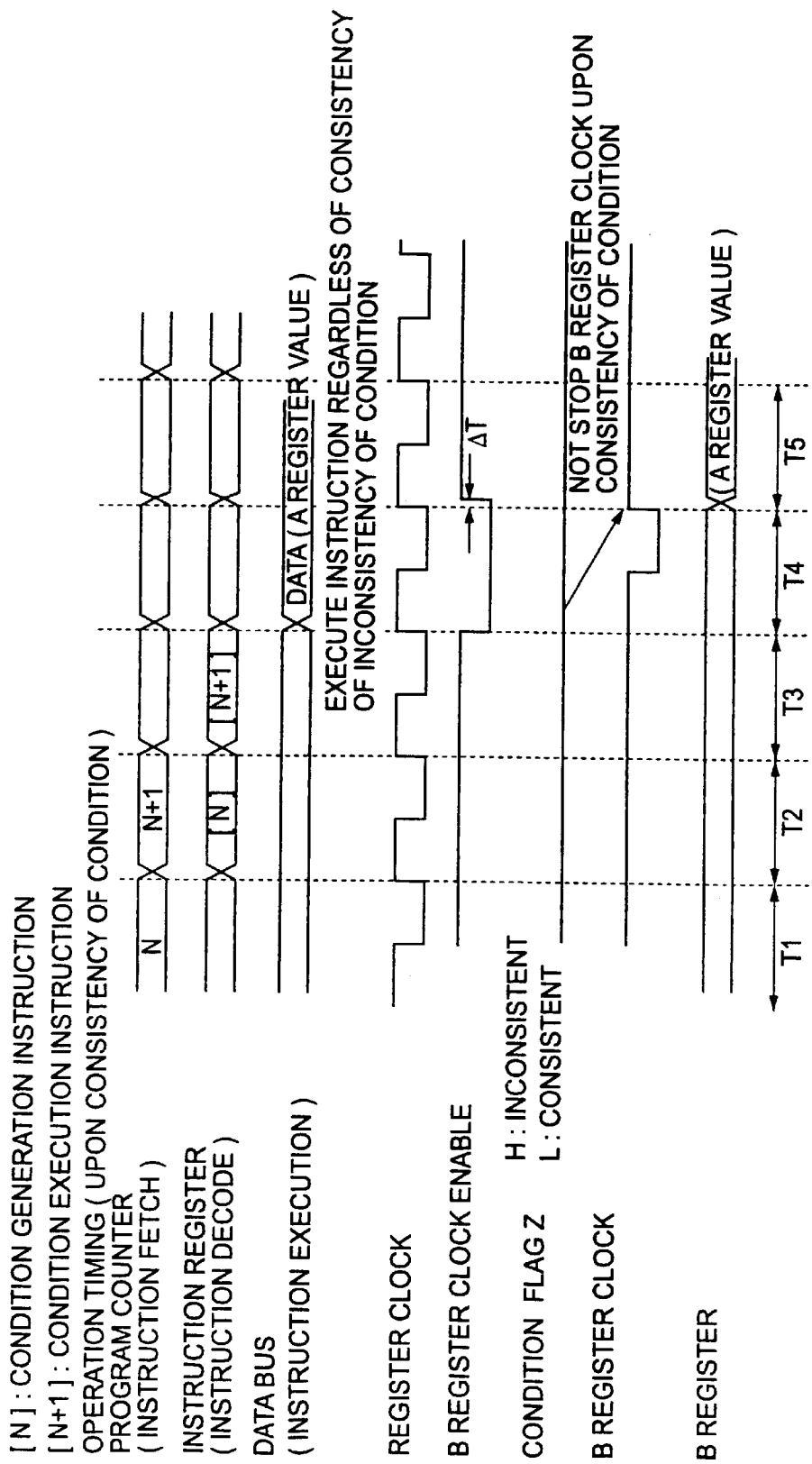
FIG. 2 is a diagram showing a timing chart for explaining operation of the digital signal processor shown in FIG. 1 (in case of the condition being consistent)
Figure 3:
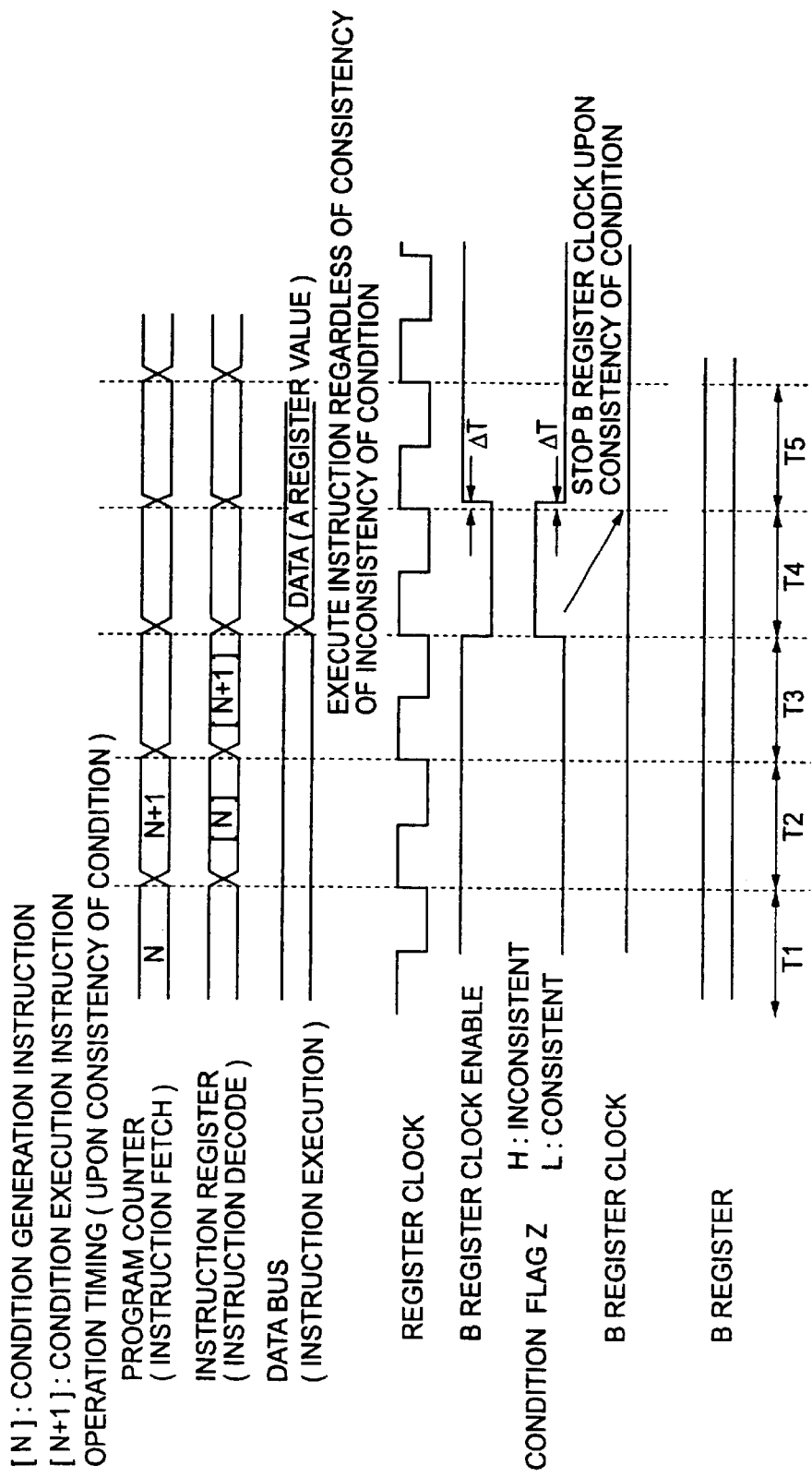
FIG. 3 is a diagram showing a timing chart for explaining operation of the digital signal processor shown in FIG. 1 (in case of the condition being inconsistent)
Figure 4:
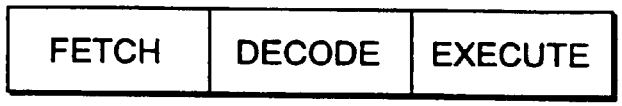
FIG. 4 is a diagram explaining an aspect of pipeline processing having three steps: instruction fetch cycle, instruction decode cycle and instruction execution cycle.
Figure 4:
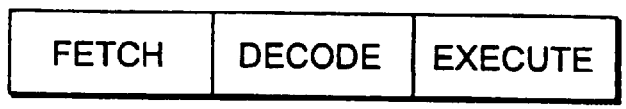
Figure 4:
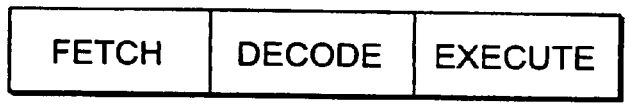
Figure 5:
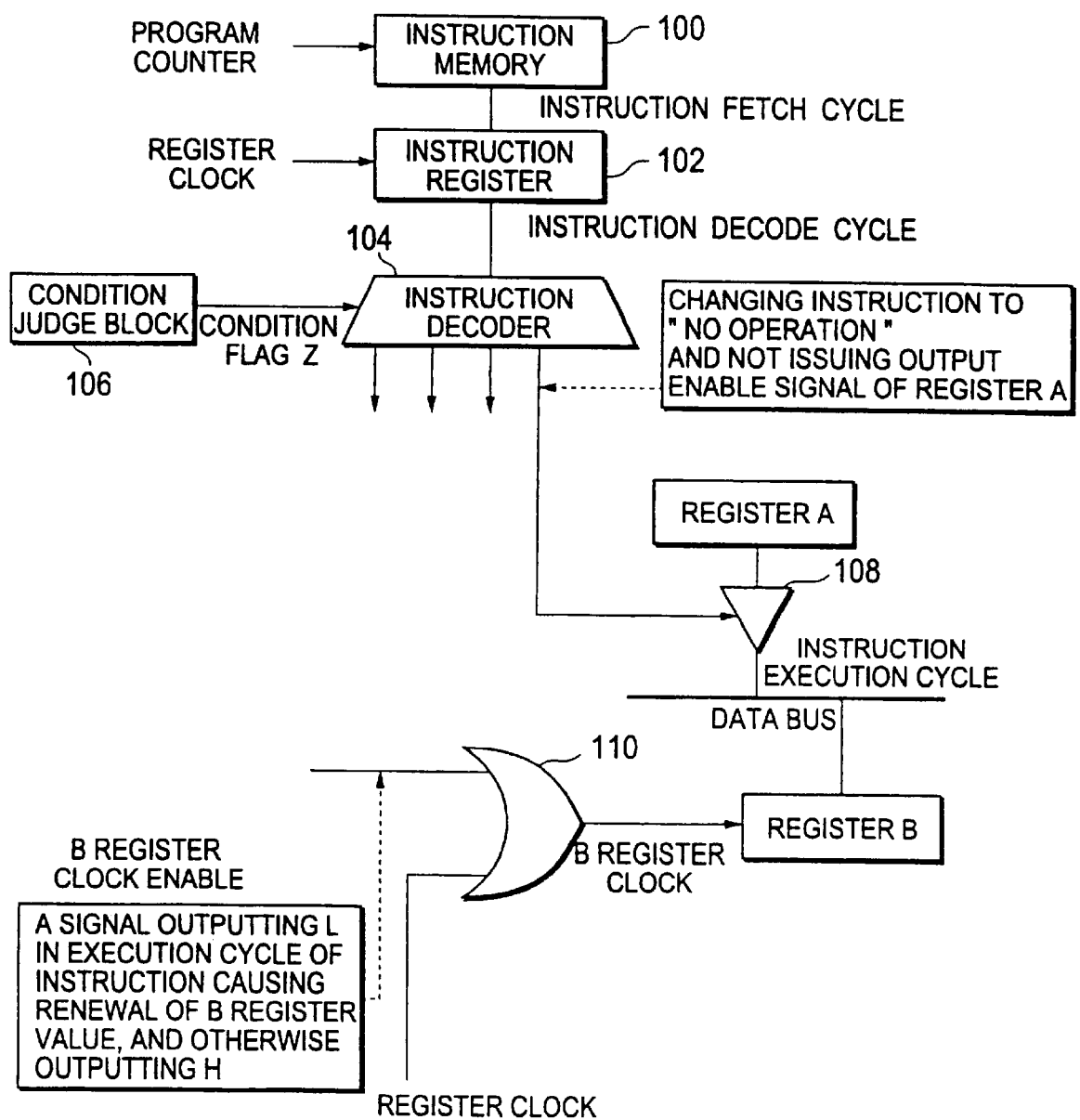
FIG. 5 is a diagram showing construction of a conventional digital signal processor.
Figure 6:
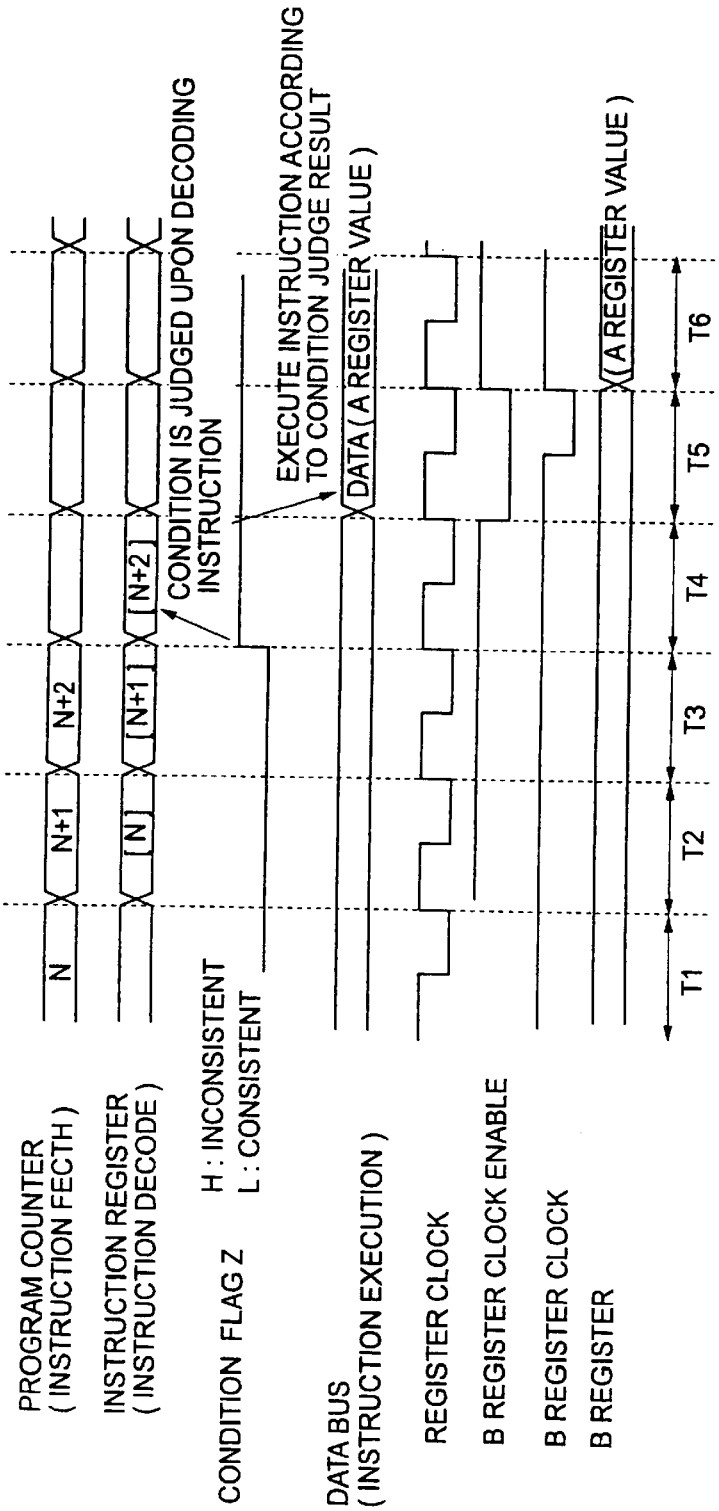
FIG. 6 is a diagram showing a timing chart for explaining operation of the digital signal processor shown in FIG. 5 (in case of the condition being consistent)
Figure 7:
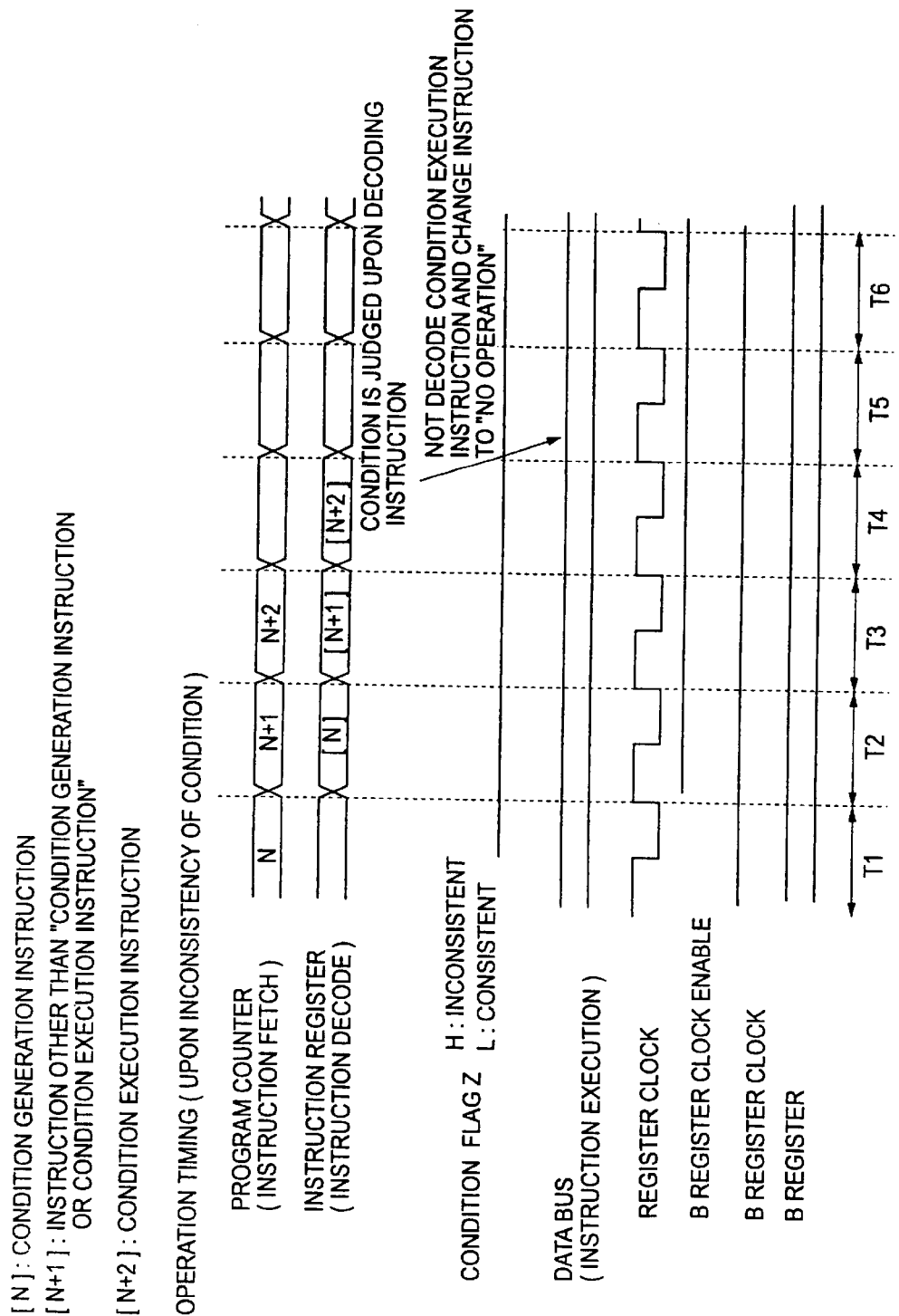
FIG. 7 is a diagram showing a timing chart for explaining operation of the digital signal processor shown in FIG. 5 (in case of the condition being inconsistent).

FIG. 1 is a diagram showing a hardware construction of DSP according to the embodiment. FIG. 2 is a diagram showing an operation timing chart in case of coincidence of the condition in DSP shown in FIG. 1. FIG. 3 is a diagram showing an operation timing chart in case of inconsistency of the condition in DSP shown in FIG. 1.

First referring to FIG. 1, the hardware construction of DSP according to the embodiment is explained. Similarly to the above-introduced conventional technique, here is explained the case where the condition execution instruction N+1 is executed according to a result of the instruction N for generating a condition. For example, it is the case where the flag Z changes to 1 or 0 in response to a result of operation of the instruction N, and if the flag exhibits 1 upon the instruction N+1, the register B is replaced by the content of the register A.

As shown in FIG. 1, DSP according to the embodiment includes an instruction memory 10, an instruction register 12, and an instruction decoder 14. The instruction memory 10 stores programs. The instruction memory 10 is supplied with a program counter designating the address of the instruction to be next executed.

The instruction register 12 fetches the instruction in an instruction fetch cycle in response to a value of the program counter from the instruction memory 10. The instruction register 12 is supplied with a register clock.

The instruction decoder 14 decodes the instruction in the instruction register 12 in an instruction decode cycle. The instruction decoder 14 decodes the instruction so as to execute the condition execution instruction regardless of consistency/inconsistency of the condition, instead of decoding it by matching it with the condition flag Z. That is, in the embodiment shown here, decoding is conducted to assign the content of the register A to the content of the register B. Then, the instruction decoder 14 outputs an enable signal to the gate 16 of the register A. That is, regardless of consistency/inconsistency of the condition, the gate 16 is enabled. Thus, the content of the register A rides on the data bus.

Whether the content of the register A put on the data bus is taken or not taken into the register B depends upon whether the B register clock is input to the register B or not. If the B register clock is input to the register B, then the register B introduces the content of the data bus. If the B register clock is not input to the register B, then the register B does not introduce the content of the data bus.

The register A, gate 16, data bus and register B explained above make up an instruction execution circuit 18 according to the embodiment.

In order to control the input of the B register clock in this manner, DSP according to the embodiment uses a gating circuit 20. The gating circuit 20 includes an OR circuit 22. The OR circuit 22 is supplied with a signal of the condition flag Z output from the condition judge block 24, B register clock enable, and register clock. That is, upon inconsistency of the condition, the condition judge block 24 has the condition flag Z stand merely in one clock cycle which is the cycle for executing the condition execution instruction. Therefore, HIGH is input to the OR circuit 22 merely in one clock cycle. Additionally, regardless of consistency/inconsistency of the condition, the condition execution instruction is executed, and the B register clock enable changes from HIGH to LOW for only one clock cycle. However, since the condition flag Z simultaneously changes from LOW to HIGH for only one clock cycle, the B register clock is fixed to the HIGH state. When the condition is consistent, the condition flag Z is LOW, and the B register clock enable changes from HIGH to LOW for only one clock cycle. Therefore, the register clock is output as the B register clock from the OR circuit 22 in only one cycle.

The instruction execution circuit 18 and the gating circuit explained above make up a conditional instruction execution circuit 26 according to the embodiment.

Next referring to FIGS. 2 and 3, an operation timing for executing a condition instruction in DSP shown in FIG. 1 is explained. As set forth above, the instruction N is for generating a condition, with which the flag Z is changed to 1 or 0 as a result of an operation instruction, for example. Instruction N+1 is a condition execution instruction whose execution depends upon a result of the instruction N. For example, it is an instruction like "if Z=1 then B=A" which transfers from the content of the register A to the register B when the flag Z is 1.

When the condition is consistent, the operation progresses as follows. As shown in FIG. 2, in the clock cycle T1, the instruction N for generating a condition is fetched. As a result, as shown in FIG. 1, the instruction N is fetched in the instruction register 12 from the instruction memory 10. Next, as shown in FIG. 2, in the clock cycle T2, the instruction N is decoded. Simultaneously, the next condition execution instruction N+1 is fetched. That is, as shown in FIG. 1, the instruction N is introduced into the instruction decoder 14 from the instruction register 12 and decoded therein, and the instruction N+1 is introduced simultaneously into the instruction register 12 from the instruction memory 10 and fetched there.

Subsequently, as shown in FIG. 2, in the clock cycle T3, the instruction N is executed, and the instruction N+1 is decoded simultaneously. In the example of FIG. 2 where the condition is consistent, at the rising edge of the register clock subsequent to execution of the instruction N, the condition flag Z remains LOW. Upon decoding the instruction N+1, irrespectively of the result of execution of the instruction N, the instruction for replacing the register B with the content of the register A is decoded. That is, at the rising edge of the register clock, the gate 16 shown in FIG. 1 is enabled, and the value of the register A is put on the data bus. On the other hand, as shown in FIG. 2, since the instruction N+1 is an instruction having the possibility of renewing the value of the register B, the B register clock enable changes from HIGH to LOW at the rising edge of the register clock.

After that, as shown in FIG. 2, the clock cycle T4 is a cycle for executing the instruction N+1. In the clock cycle T4, the B register clock enable is LOW, and the condition flag Z is also LOW. Therefore, as shown in FIG. 1, the OR circuit 22 outputs the register clock as the B register clock. That is, as shown in FIG. 2, the register clock is output to the B register clock for only one clock cycle. As a result, at the rising edge of the B register clock, the content of the data bus is fetched in the register B.

Then, as shown in FIG. 2, in the clock cycle T5, the B register clock enable restores the original state HIGH. Therefore, as shown in FIG. 1, a HIGH signal is output from the OR circuit 22 as the B register clock. As a result, in the clock cycle T5 et seq., the absorbed content of the register A is maintained in the register B. In the clock cycle T4, in order to ensure appearance of the rising edge of the B register clock, the B register clock enable is controlled to rise with a delay by ΔT.

In contrast, when the condition is inconsistent, the operation progresses as follows. As shown in FIG. 3, the operation timing up to the clock cycle T3 is the same as the operation timing explained with reference to FIG. 2.

In the clock cycle T3, the instruction N is executed, and the instruction N+1 is decoded simultaneously. In the example of FIG. 3 where the condition is inconsistent, as a result of execution of the instruction N, the condition flag Z changes from LOW to HIGH at the rising edge of the register clock for only one clock cycle. The condition flag Z is controlled to rise with a delay from the register clock by ΔT. Upon decoding the instruction N+1, irrespectively of the result of execution of the instruction N, an instruction for replacing the register B with the content of the register A is decoded. That is, at the rising edge of the register clock, the gate 16 shown in FIG. 1 is enabled, and the value of the register A is put on the data bus. On the other hand, as shown in FIG. 3, since the instruction N+1 has the possibility of renewing the value of the register B, the B register clock enable changes from HIGH to LOW at the rising edge of the register clock.

Next, as shown in FIG. 3, the clock cycle T4 is the cycle for executing the instruction N+1. In the clock cycle T4, the B register clock enable is LOW, but the condition flag Z is HIGH. Therefore, as shown in FIG. 1, a HIGH state signal is output from the OR circuit 22 as the B register clock. That is, as shown in FIG. 3, the B register clock continuously remains HIGH. Therefore, the content of the data bus is not introduced into the register B.

Next, as shown in FIG. 3, in the clock cycle T5, the B register clock enable restores the original state HIGH. However, the output from the OR circuit 22 maintains the HIGH state, and it is output as the B register clock. Therefore, also in the clock cycle T5 et seq., the register B never introduce the content of the data bus. Here again, the B register clock enable is controlled to rise with the delay of ΔT for the above-mentioned purpose.

As explained above, in DSP according to the embodiment, since the gating circuit 20 is used for controlling the B register clock supplied to the register B, the instruction N for generating a condition and the condition execution instruction N+1 using the condition can be executed consecutively. Therefore, DSP removes the need for an instruction other than "condition generation instruction or condition execution instruction", which was conventionally required to insert between the instruction for generating the condition and the condition execution instruction. As a result, efficient programs can be made, and instructions in programs can be reduced.

More specifically, in order to permit the condition execution instruction N+1 using a condition to be decoded prior to execution of the instruction N for generating the condition, the instruction N+1 is decoded in the decoding step thereof under assumption that the condition is consistent, and the value of the register A is put on the data bus. Then, in the step for executing the instruction N+1, reflecting the result of the condition generating instruction N already executed, only when the condition is consistent, the B register clock is supplied from the gating circuit 20 to the B register, and the content of the data bus is introduced into the register B. In this manner, even if the condition execution instruction N+1 is decoded before execution of the condition generating instruction N is completed, property of the result of execution can be maintained.

The invention is not limited to the embodiments shown above, but can be modified in various modes. For example, it is applicable not only to the register replacement instruction explained above but also to a data transfer instruction, addressing instruction, ALU operation instruction, and so forth. That is, the registers A, B and the data bus are examples of instruction execution circuits, and the invention is applicable to other instruction execution circuits. In other words, the invention is applicable to any instruction execution circuit of an instruction incrementing a program counter by one.

Although the embodiment shown above has been explained as applying the invention to a digital signal processor, it is also applicable to ordinary processors used in generalized computers, etc.

As described above, in the digital signal processor or a processor according to the invention, since a redundant instruction other than "condition generating instruction or condition execution instruction" need not be inserted between an instruction for generating a condition and a condition execution instruction determined to be executed or not depending upon the result of execution of the instruction for generating the condition, the number of instructions can be reduced upon processing the condition execution instruction.

What is claimed is:

1. A digital signal processor for executing pipeline processing divided into at least three steps that are an instruction fetch cycle, an instruction decode cycle and an instruction execution cycle, comprising:

an instruction memory storing a program;

an instruction register synchronous with a first clock signal to fetch an instruction of said program from said instruction memory in accordance with a program counter in said instruction fetch cycle;

an instruction decoder synchronous with said first clock signal to decode the instruction fetched in said instruction register in said instruction decode cycle, said instruction decoder decoding the instruction under the assumption that a condition be consistent when the instruction is a condition execution instruction whose execution depends upon a result of execution of an instruction for generating the condition; and a conditional instruction execution circuit synchronous with said first clock signal to execute the instruction pursuant to a result of decoding and store a result of execution in said instruction execution cycle, wherein said conditional instruction execution circuit being configured to execute the condition execution instruction, and put the result of execution of the condition execution instruction on a data bus and take the result from the data bus to a destination register in the instruction execution cycle for said condition execution instruction when the condition is consistent as a result of execution of the instruction for generating the condition, said conditional instruction execution circuit being configured to execute said condition execution instruction and put the result of execution of the condition execution instruction on the data bus, but not to take the result from the data bus to the destination register in the instruction execution cycle for said condition execution instruction when the condition is inconsistent as a result of execution of the instruction for generating the condition, wherein said conditional instruction execution circuit includes:
  an instruction executing circuit for executing said condition execution instruction and storing a result of the execution; and
  a gating circuit for controlling the supply of a second clock signal to said instruction execution circuit, wherein said second clock signal is supplied from said gating circuit to said instruction execution circuit when said conditional instruction execution circuit stores the result of execution of said condition execution instruction in said instruction execution cycle, whereas said second clock signal is not supplied from said gating circuit to said instruction execution circuit when said conditional instruction execution circuit does not store the result of execution of said condition execution instruction in said instruction execution cycle, wherein said instruction execution circuit includes:
  an original register; and
  a switching circuit coupling said original register to said data bus to put the value of said destination register onto said data bus when a first enable signal is input from said instruction decoder, wherein the destination register takes the value on said data bus when said second clock signal is input from said gating circuit, wherein said instruction decoder supplies said first enable signal when the current instruction is said condition execution instruction, and said gating circuit is configured to supply said second clock signal to said destination register when the result of execution of the instruction for generating the condition is consistent with the condition and not to supply said second clock signal when the result of execution of the instruction for generating the condition is inconsistent with the condition, wherein said gating circuit includes a logic circuit supplied with a condition flag signal changing its flag depending upon the result of execution of the instruction for generating the condition, a second enable signal changing its state when said condition execution instruction is decoded, and said first clock signal, and said second clock signal is supplied from said logic circuit to said destination register only when said condition is consistent.

2. The digital signal processor according to claim 1 wherein said logic circuit is made up of an OR circuit,
  said condition flag signal input to said OR circuit being a signal inverting a condition flag which takes a HIGH state for only one clock cycle when said condition is consistent,
  said second enable signal input to said OR circuit being a signal taking a LOW state for only clock cycle when said condition execution instruction is decoded.

3. A digital signal processor for executing pipeline processing divided into at least three steps that are an instruction fetch cycle, an instruction decode cycle and an instruction execution cycle, comprising:
  instruction memory storing a program;
  an instruction register synchronous with a first clock signal to fetch an instruction of said program from said instruction of said program from said instruction memory in accordance with a program counter in said instruction fetch cycle;
  an instruction decoder synchronous with said first clock signal to decode the instruction fetched in said instruction register in said instruction decode cycle, said instruction decoder outputting a first enable signal to one register so as to put the value of said one register onto a data bus under the assumption that a condition be consistent in the case where said decoded instruction is a condition execution instruction for transferring the value of said one register to another register for only when the result of execution of the instruction for generating a condition is consistent with a predetermined condition; and
  a gating circuit for controlling the supply of a second clock signal in the instruction execution cycle of said condition execution instruction to supply said second clock signal to said another register thereby to permit same to introduce the value on said data bus upon consistency of said condition, and not to supply said second clock signal to said another register thereby to prevent the value on said data bus from being introduced into said another register upon inconsistency of said condition, wherein said first enable signal is input to a switching circuit interposed between said one register and said data bus, said switching circuit putting the value of said one register on said data bus when said first enable signal is input, wherein said gating circuit includes a logic circuit supplied with a condition flag signal changing its flag depending upon the result of execution of the instruction for generating the condition, a second enable signal changing its state when said condition execution instruction is decoded, and said first clock signal, and said second clock signal being supplied from said logic circuit to said second register only when said condition is consistent.

4. The digital signal processor according to claim 3 wherein said logic circuit is made up of an OR circuit,
  said condition flag signal input to said OR circuit being a signal inverting a condition flag which takes a HIGH state for only one clock cycle when said condition is consistent, said second enable signal input to said OR circuit being a signal taking a LOW state for only clock cycle when said condition execution instruction is decoded.

5. A processor for executing pipeline processing divided into at least three steps that are an instruction fetch cycle, an instruction decode cycle and an instruction execution cycle, comprising:

an instruction memory storing a program;

an instruction register synchronous with a first clock signal to fetch an instruction of said program from said instruction memory in accordance with a program counter in said instruction fetch cycle;

an instruction decoder synchronous with said first clock signal to decode the instruction fetched in said instruction register in said instruction decode cycle, said instruction decoder decoding the instruction under the assumption that a condition be consistent when the instruction is a condition execution instruction whose execution depends upon a result of execution of an instruction for generating the condition; and a conditional instruction execution circuit synchronous with said first clock signal to execute the instruction pursuant to a result of decoding and store a result of execution in said instruction execution cycle, wherein said conditional instruction execution circuit being configured to execute the condition execution instruction, and put the result of execution of the condition execution instruction on a data bus and take the result from the data bus to a destination register in the instruction execution cycle for said condition execution instruction when the condition is consistent as a result of execution of the instruction for generating the condition, said conditional instruction execution circuit being configured to execute said condition execution instruction result from the data bus to the destination register in the instruction execution cycle for said condition execution instruction when the condition is inconsistent as a result of execution of the instruction for generating the condition, wherein said conditional instruction execution circuit includes:

an instruction executing circuit for executing said condition execution instruction and storing a result of the execution; and a gating circuit for controlling the supply of a second clock signal to said instruction execution circuit, wherein said second clock signal is supplied from said gating circuit to said instruction execution circuit when said conditional instruction execution circuit stores the result of execution of said condition execution instruction in said instruction execution cycle, whereas said second clock signal is not supplied from said gating circuit to said instruction execution circuit when said conditional instruction execution circuit does not store the result of execution of said condition execution instruction in said instruction execution cycle, wherein said instruction execution circuit includes:

an original register; and a switching circuit coupling said original register to said data bus to put the value of said destination register onto said data bus when a first enable signal is input from said instruction decoder, wherein the destination register takes the value on said data bus when said second clock signal is input from said gating circuit, wherein said instruction decoder supplies said first enable signal when the current instruction is said condition execution instruction, and said gating circuit is configured to supply said second clock signal to said destination register when the result of execution of the instruction for generating the condition is consistent with the condition and not to supply said second clock signal when the result of execution of the instruction for generating the condition is inconsistent with the condition, wherein said gating circuit includes a logic circuit supplied with a condition flag signal changing its flag depending upon the result of execution of the instruction for generating the condition, a second enable signal changing its state when said condition execution instruction is decoded, and said first clock signal, and said second clock signal is supplied from said logic circuit to said destination register only when said condition is consistent.

6. The processor according to claim 5 wherein said logic circuit is made up of an OR circuit, said condition flag signal input to said OR circuit being a signal inverting a condition flag which takes a HIGH state for only one clock cycle when said condition is consistent, said second enable signal input to said OR circuit being a signal taking a LOW state for only clock cycle when said condition execution instruction is decoded.

* * * * *